United States Patent
König et al.

(10) Patent No.: US 9,969,373 B2
(45) Date of Patent: May 15, 2018

(54) MASTER BRAKE CYLINDER FOR A HYDRAULIC MOTOR VEHICLE BRAKE SYSTEM

(71) Applicant: Continental Teves AG & Co. oHG, Frankfurt (DE)

(72) Inventors: Harald König, Ober-Mörlen (DE); Kai-Michael Graichen, Egelsbach (DE); Stephan Krebs, Eschborn (DE); Michael Kollers, Eschborn (DE); Horst Krämer, Ginsheim-Gustavburg (DE); Andreas Macher, Mörfelden-Walldorf (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 369 days.

(21) Appl. No.: 14/760,804

(22) PCT Filed: Jan. 30, 2014

(86) PCT No.: PCT/EP2014/051855
§ 371 (c)(1),
(2) Date: Jul. 14, 2015

(87) PCT Pub. No.: WO2014/118302
PCT Pub. Date: Aug. 7, 2014

(65) Prior Publication Data
US 2015/0353066 A1    Dec. 10, 2015

(30) Foreign Application Priority Data
Jan. 30, 2013  (DE) ..................... 10 2013 201 559

(51) Int. Cl.
*B60T 11/20* (2006.01)
*B60T 11/232* (2006.01)
*B60T 11/236* (2006.01)

(52) U.S. Cl.
CPC ............. *B60T 11/20* (2013.01); *B60T 11/232* (2013.01); *B60T 11/236* (2013.01)

(58) Field of Classification Search
CPC ........ B60T 11/16; B60T 11/20; B60T 11/232; B60T 11/236; F16J 15/16
See application file for complete search history.

(56) References Cited

U.S. PATENT DOCUMENTS

| 7,040,093 B2 | 5/2006 | Legret |
| 7,055,322 B2 | 6/2006 | Yasuda |

(Continued)

FOREIGN PATENT DOCUMENTS

| DE | 102004048670 | 6/2005 |
| DE | 60208806 | 8/2006 |

(Continued)

OTHER PUBLICATIONS

German Search Report for German Application No. 10 2014 201 700.9 dated Jun. 2, 2014, including partial translation.

(Continued)

*Primary Examiner* — Logan Kraft
(74) *Attorney, Agent, or Firm* — RatnerPrestia (57) ABSTRACT

A tandem master brake cylinder for a hydraulic motor vehicle brake system, which is impinged upon by a pneumatic brake booster, including at least one piston which is displaceable in a housing and has a plurality of follow-up connections the follow-up connections allowing a hydraulic connection between the pressure chamber and a pressureless follow-up chamber at the start of a braking operation. At least some of the follow-up connections are formed as transverse bores through a wall of at least one piston and are arranged at a same distance relative to the piston edge in a main plane, wherein the overtravel thereof by the sealing collar defines a closure path of the piston. In order to allow (Continued)

a smooth, quiet and yet sufficiently reliable braking initiation, the follow-up connections are arranged in a distributed manner on at least three planes, the planes being arranged at a distance to one another and in parallel to the piston edge.

16 Claims, 7 Drawing Sheets

(56) References Cited

U.S. PATENT DOCUMENTS

| | | |
|---|---|---|
| 7,861,524 B2 | 1/2011 | Kim |
| 7,997,075 B2 | 8/2011 | Drott |
| 2005/0172626 A1 | 8/2005 | Lebret |

FOREIGN PATENT DOCUMENTS

| | | |
|---|---|---|
| DE | 102008013348 | 9/2008 |
| WO | 2005066005 | 7/2005 |

OTHER PUBLICATIONS

International Search Report for International Application No. PCT/EP2014/051855 dated May 23, 2014.

MASTER BRAKE CYLINDER FOR A HYDRAULIC MOTOR VEHICLE BRAKE SYSTEM

CROSS REFERENCE TO RELATED APPLICATIONS

This application is the U.S. National Phase Application of PCT International Application No. PCT/EP2014/051855, filed Jan. 30, 2014, which claims priority to German Patent Application No. 10 2013 201 559.3, filed Jan. 30, 2013, the contents of such applications being incorporated by reference herein.

FIELD OF THE INVENTION

The invention relates to a hydraulic tandem master brake cylinder, in particular a tandem master brake cylinder of dual circuit construction, for a hydraulic motor vehicle brake system. A pneumatic brake booster, which makes possible a boosting function, is generally connected upstream of a master brake cylinder of this kind. The unit comprising the master cylinder and the brake booster is generally referred to as a braking unit and is part of a motor vehicle brake system.

BACKGROUND OF THE INVENTION

Tandem master brake cylinders are known. For correct operation of a tandem master brake cylinder, it is necessary to ensure a hydraulic connection between the pressure chamber and a pressure medium reservoir both in an initial position or neutral position in an unbraked state and also, briefly, at the beginning of the braking operation or at the beginning of the movement of the piston. For this purpose, known pistons of plunger-type tandem master brake cylinders generally have a series of replenishing connections embodied as radial bores, referred to as "suction bores".

To improve behavior when braking is initiated, especially to ensure a reliable hydraulic connection to the pressure medium reservoir and to avoid play or a pedal idle travel, the known prior art (e.g. DE102004048670A1, DE60208806T2) which is incorporated by reference, also has further modifications. For example, the prior art includes plunger-type tandem master brake cylinders for hydraulic motor vehicle brake systems, the secondary pistons of which have "anti-cavitation" or "pilot" bores in addition to a single row of suction bores. This is a row of additional through openings offset relative to the plane of the suction bores, counter to the actuating direction, with the result that they are closed later during closure, the cumulative passage area of which openings is significantly less than the passage area of the suction bores.

In many known brake systems, the aim is to keep a pedal idle travel as short as possible in order to achieve a rapid braking force buildup after as short a time delay as possible.

Among the factors that are regarded as disadvantageous in known systems is the fact that a short pedal idle travel and a subsequent steep pressure rise in such systems can lead to severe losses of comfort, e.g. owing to a hard, unpleasant pedal feel or greater noise generation due to abrupt deceleration of a brake booster piston or diaphragm plate coupled to the tandem master brake cylinder with a control housing.

It is furthermore known that dynamic effects can lead to noise due to the deceleration of the internal parts of a pneumatic brake booster if the inflowing atmospheric volume comes to a halt ad hoc when it runs up against the hydraulic column in the chambers of the tandem master brake cylinder after the hydraulic closing travel in the tandem master brake cylinder has been traversed by the pistons. There is "application knock".

SUMMARY OF THE INVENTION

An aspect of the invention offers an improved motor vehicle brake system which, while avoiding the abovementioned disadvantages from the prior art, allows gentle, quiet and yet sufficiently reliable initiation of braking.

Since the replenishing connections are arranged on the lateral surface in such a way that they are not arranged on a single line running around parallel to the piston edge or in a plane extending transversely to the piston bore but are distributed between at least 3 planes arranged at staggered distances from the piston edge or cascade-fashion, it is advantageously possible to achieve continuous, successive closure of the piston bores and thus more prolonged maintenance of a cross section or passage area through which there is flow after the initiation of a braking operation, and thus to avoid hard, abrupt brake pedal behavior and to reduce unwanted noise generation.

In the advantageous developments, it is possible, depending on the desired closing behavior, for the spacing between the individual planes or cascades to be defined in larger or smaller intervals. It is thereby possible to optimize the brake system in a particularly efficient and economical way in respect of a desired total closing travel and pressure gradient depending on the hydraulic load and dynamics of the braking unit.

In contrast to conventional larger replenishing connections, relatively small replenishing connections are preferably used according to the invention.

In another embodiment according to the invention, the main plane, i.e. the plane which closes last during actuation, preferably has at least 3 replenishing connections. According to an advantageous development, the number of openings in the second plane is at most the same as the number of openings in the main plane. It is thereby possible for the reduction in the flow cross section to be made more uniformly during initiation of braking and to avoid abrupt closure.

According to another advantageous development, each replenishing connection in the main plane has a cross section which is at least equal to that of each of the replenishing connections in the other planes.

In a particularly preferred embodiment, all the replenishing connections in all the planes are of equal size.

As an advantageous option, the planes 2, 3 and further planes can be provided in a manner arranged offset forward in the actuating direction relative to the main plane, with the result that there are no openings which are subsequently closed during closure as "pilot bores". Because of this, there is no speed-dependent reduction in the speed of pressure buildup at low actuating speeds.

As a preferred option, the spacing between the first plane and a last plane (third, fourth etc., depending on the embodiment) can be in a range between 0.5 mm and 3 mm.

In a particularly preferred embodiment, the spacing between the first and the last plane is in a range between 0.9 mm and 1.5 mm.

By means of the features designated above, it is possible, in particular, to enable the following:
  gentle hydraulic pressure buildup in the master brake
    cylinder toward the end of the closing travel or a shallow gradient of the reduction in cross section during the closure of the main plane, compensation of unwanted dynamic effects which can cause noise, ensuring reliable opening even with the main plane alone without reducing play (idle travel).

BRIEF DESCRIPTION OF THE DRAWINGS

Further details, features, advantages and possible applications of the invention will emerge from dependent claims together with the description with reference to the drawings.

Corresponding components and design elements are provided with the same reference signs, where possible. Below.

DETAILED DESCRIPTION OF THE PREFERRED EMBODIMENTS

Figure 1:
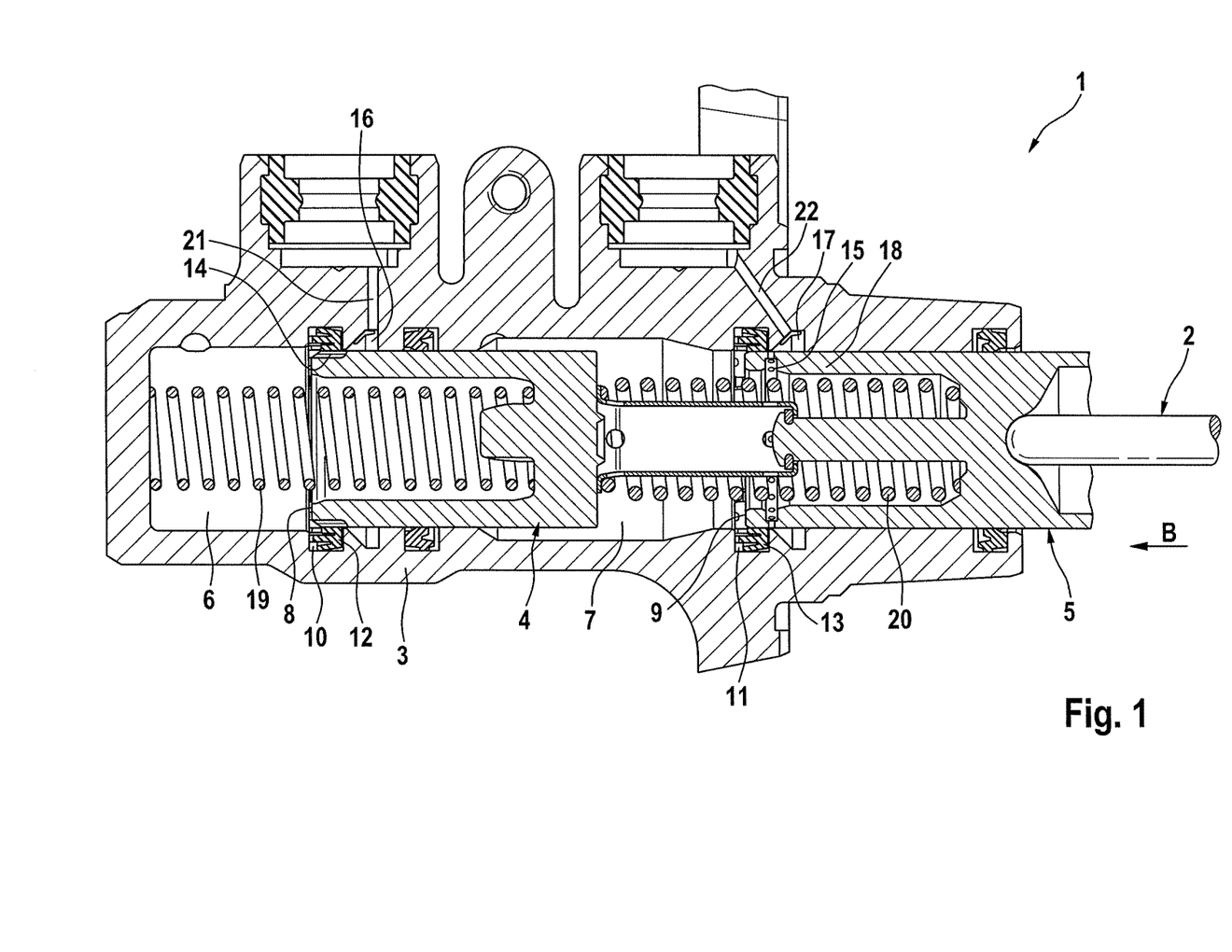
FIG. 1 shows an embodiment of a master brake cylinder according to the invention in section.

FIG. 1

In FIG. 1, a section through a first embodiment of a master brake cylinder 1 according to the invention is depicted. The master brake cylinder 1 is embodied as a tandem master cylinder of the plunger type. Because the operation of such master brake cylinders is sufficiently well known, only those characteristics which are particularly relevant to the invention will be explored below.

Two pistons 4 (secondary piston) and 5 (primary piston) are arranged in series in a housing 3 of the master brake cylinder 1 in such a way that they can be moved. In this case, piston 4 delimits a pressure chamber 6 filled with a pressure medium in the housing 3 and is sealed off relative thereto by means of a cup seal 12; piston 5 delimits pressure chamber 7, which is likewise filled with a pressure medium and is sealed off relative thereto by means of cup seal 13. Both piston 4 and piston 5 are of substantially cup-shaped design and face with their respective piston edges 8 and 9 in the direction of the respectively delimited pressure chamber 6 or 7. A brake pressure which can be produced in the pressure chambers 6, 7 is passed to the wheel brakes (not shown) via brake lines (not shown).

The cup seals 12, 13 are each positioned in the annular grooves 10, 11 in the housing 3.

Replenishing chambers 16 and 17, each designed as an annular groove with a flank beveled in the direction of annular grooves 10 and 11, respectively, are arranged around the pistons 4, 5 in the housing 3, directly ahead of the annular grooves 10, 11 in the actuating direction B. The replenishing chambers 16, 17 are permanently connected, via replenishing passages 21, 22, to chambers of a pressureless pressure medium reservoir (not shown) and therefore likewise remain pressureless.

The pistons 4, 5 have a plurality of replenishing connections 14 and 15, which allow a hydraulic connection between the respective pressure chambers 6, 7 and the pressureless replenishing chambers 16, 17 in the unactuated initial position shown, irrespective of the cup seals 14, 15, and thus assist pressure compensation and venting of the brake system.

During a braking operation, the two return springs 19 and 20 are compressed by movement of the pistons 4 and 5 in the actuating direction B and serve to return the two pistons 4, 5 to their respective unactuated initial positions after the ending of a braking operation.

Piston 5 is actuated by a push rod of a pneumatic brake booster 2 (otherwise not shown). During a braking operation, the brake booster 2 acts on piston 5 in the actuating direction B with a force and moves it out of its unactuated initial position in the direction of piston 4. During this process, piston 4 is initially taken along in the same direction, largely in synchronism with piston 5, owing to the stiffness of the return spring 20, and then by a brake pressure building up in pressure chamber 7. During this process, the replenishing connections 14, 15 are successively shut off from the replenishing chambers 16, 17 as they are crossed by the cup seals 12, 13, and a flow of the pressure medium that could be displaced from the pressure chambers 6, 7 into the replenishing chambers 16, 17 is prevented, with the result that brake pressure can be built up in the pressure chambers 6, 7. A displacement travel of the piston, during which the replenishing connections 14, 15 are shut off from the replenishing chambers 16, 17 by cup seals 12, 13, is generally referred to as a closing travel.

If the hydraulic connection to the replenishing chambers 16, 17 is interrupted too abruptly during this process, e.g. during a full braking operation, this can lead in general to an unintentionally quick deceleration of piston 5 and likewise of the moving components of a pneumatic brake booster 2 connected to piston 5 by the piston rod but also to disruption of air flows within the brake booster 2. As a result, high levels of noise may be generated—"application knock". Abrupt deceleration of the piston furthermore causes a hard and unpleasant pedal feel.

An improvement according to the invention of the behavior described above is explained, in particular, by the following figures.

Figure 2:
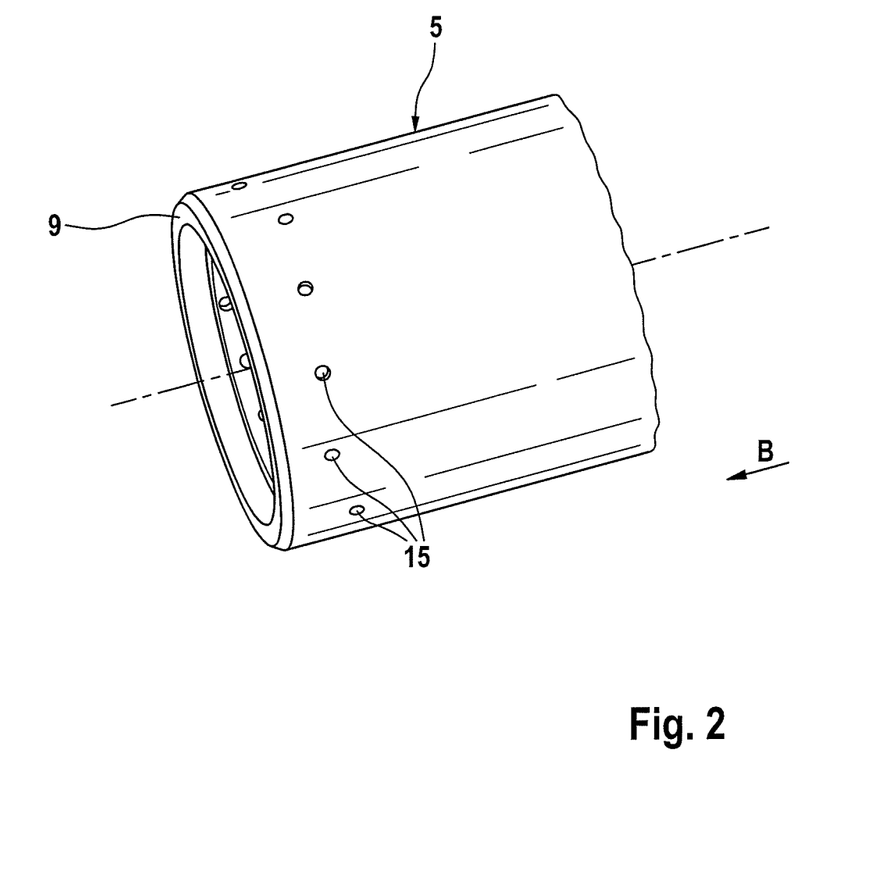
FIG. 2 shows a three-dimensional partial view of a piston according to the invention in accordance with FIG. 1.

FIG. 2

A three-dimensional partial view of a piston 5 according to the invention as shown in FIG. 1 is shown in FIG. 2.

The replenishing connections 15 are embodied as transverse bores, which are arranged in a manner distributed radially over the circumference of the lateral surface of the piston 5. At the same time, they are arranged in such a way that they are not formed on a single line or plane parallel to the piston edge 9 but are spaced apart cascade-fashion or in a manner staggered with respect to the piston edge 9 and distributed in an offset relative to one another in several planes.

By virtue of this arrangement, the individual groups of replenishing connections 15 are progressively crossed plane by plane by cup seal 13 after the initiation of a braking operation, as a result of which continuous, successive closure of the replenishing connections 15 and thus longer maintenance of the cumulative flow cross section or of the passage area is achieved.

Figure 3:
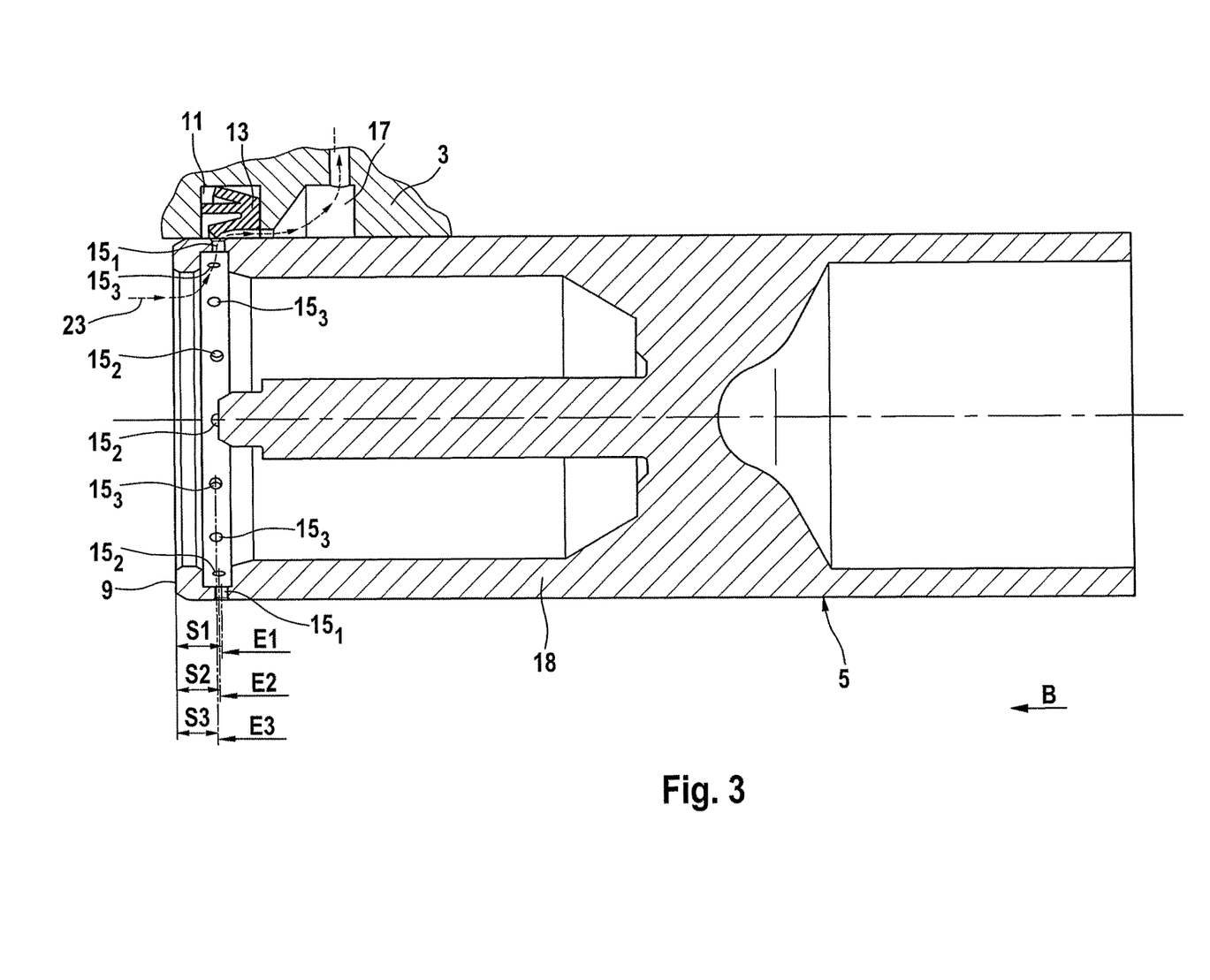
FIG. 3 shows a section through an embodiment of a piston according to the invention.

FIG. 3

FIG. 3 shows a section through a first embodiment of the piston 5 according to the invention.

As already described in FIG. 2, the replenishing connections 15 are each arranged in groups in respective planes E1, E2, E3, wherein the respective planes extend parallel to the piston edge 9 but at different distances S1, S2, S3 from said edge, wherein S1>S2>S3.

Here, a main plane E1 defines the closing travel of the piston and is arranged the furthest away from the piston edge 9 at distance S1. After the replenishing connections $15_1$ positioned in the main plane E1 have been crossed, the pressure medium flow 23 from the pressure chamber 7 to the replenishing chamber 17 is completely interrupted. Planes E2 and E3 are offset relative to the main plane E1 in the direction of the piston edge 9, that is to say there are no "pilot bores" known from the prior art, which are generally smaller and which, during closure, are closed only later, after the replenishing connections $15_1$ in the main plane E1. As a result, there is no speed-dependent slower pressure buildup at low actuating speeds.

According to an aspect of the invention, relative small transverse bores are used in all the planes E1, E2, E3 instead of the usual larger transverse bores.

Dividing the replenishing connections 15 into at least three cascades or staggered planes E1, E2, E3 proves to be particularly effective since the reduction in the cumulative flow cross section is more uniform than in the case of the small number of large transverse bores arranged in one plane because a larger diameter of the transverse bores would cause abrupt closure toward the end of the closing travel owing to the rapidly decreasing segment area of the percentage of bores through which there is still flow.

Here, the number of replenishing connections $15_1$ grouped in the main plane E1 should be at least 3, although a larger number than 3 is likewise possible within the invention. At the same time, the number of replenishing connections $15_2$ grouped in plane E2 is no greater than that in the main plane E1.

In order to avoid a slower pressure buildup at low actuating speeds, the cross-sectional areas of the replenishing connections $15_1$ in the main plane E1 are of at least the same size as the cross-sectional areas of the replenishing connections $15_2$ in the adjacent plane E2. All the cross-sectional areas of all the replenishing connections 15 are preferably of the same size in all the planes.

Depending on the desired closing behavior, the spacing between the individual planes or cascades can be varied within the invention and defined so as to be larger or smaller in order to achieve an optimum as regards the total closing travel and a pressure gradient depending on the hydraulic load and the dynamics of the braking unit.

Figure 4:
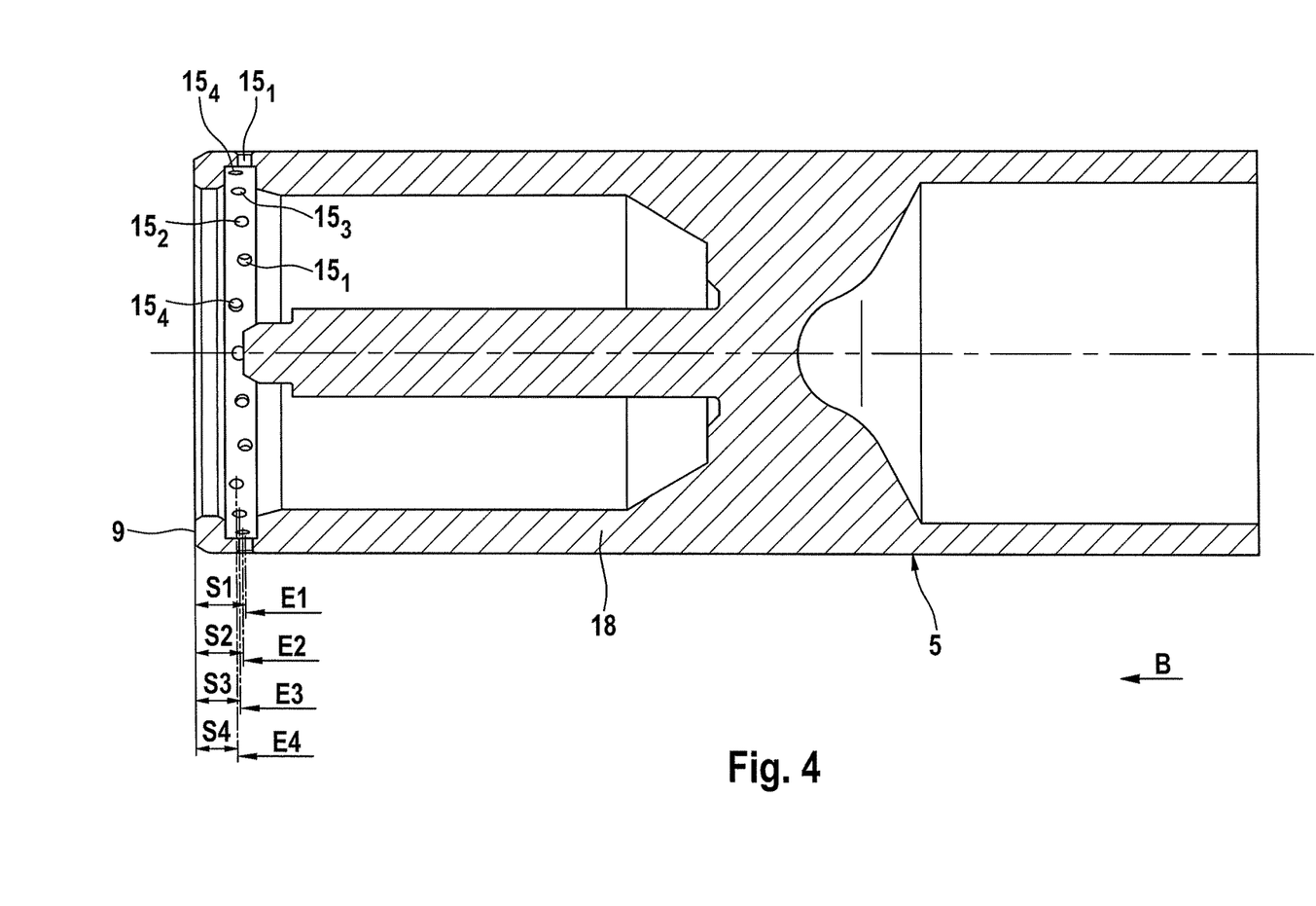
FIG. 4 shows a section through another embodiment of a piston according to the invention.

FIG. 4

FIG. 4 shows a section through another embodiment of the piston 5 according to the invention. In contrast to the embodiment according to FIG. 3, the replenishing connections 15 are arranged in 4 planes. In this case, the same conditions as those described in relation to FIG. 3 apply to the number of replenishing connections 15 in one plane, in particular the main plane E1, and the cross-sectional areas. The embodiment according to the invention which is shown allows a pleasant pedal feel, even in the case of particularly powerful and rapid braking operations.

As a preferred option, the spacing between the first plane (main plane E1) and the last plane (E3 or E4 etc., depending on the embodiment) can be in a range between 0.5 mm and 3 mm.

In a particularly preferred embodiment, the spacing between the first and the last plane is in a range between 0.9 mm and 1.5 mm.

In principle, it is also possible for more than 4 planes to be provided within the invention, but the introduction of further planes or increasing the spacing between the main plane E1 and the respective last plane beyond the proposed number and dimensions can lead to an unwanted increase in the pedal idle travel and a spongy pedal feel.

Figure 5:
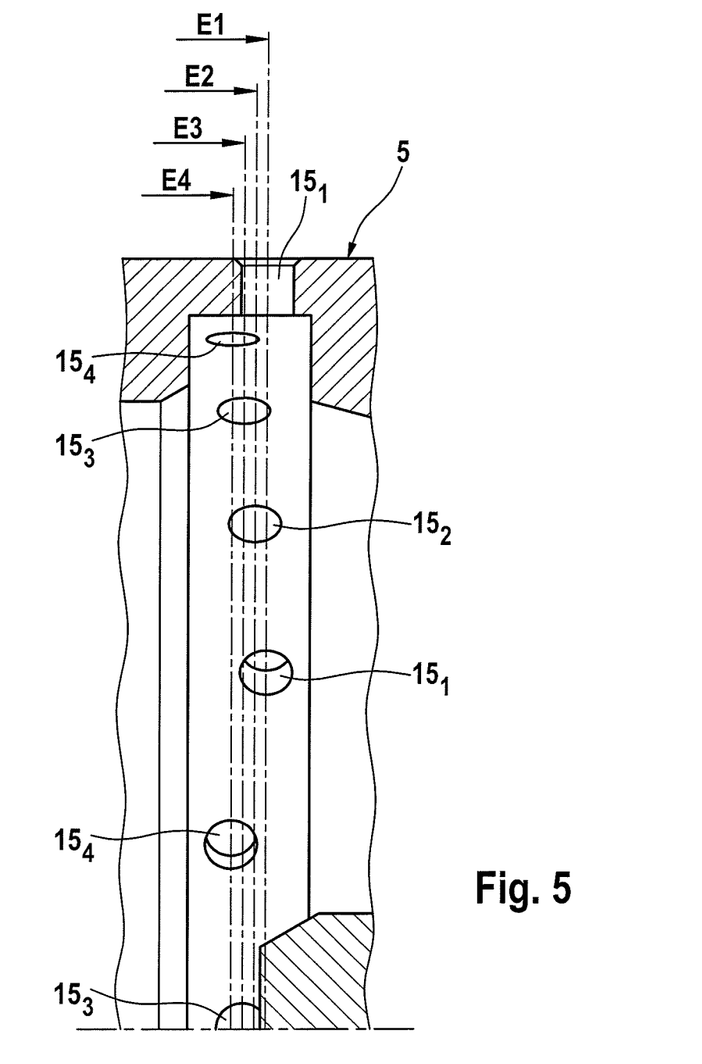
FIG. 5 shows a detail view of the piston according to FIG. 4.

FIG. 5

FIG. 5 shows the distribution of the replenishing connections 15 and the arrangement of planes E1 to E2 in a piston 5 according to FIG. 4, in an enlarged detail view.

Figure 6:
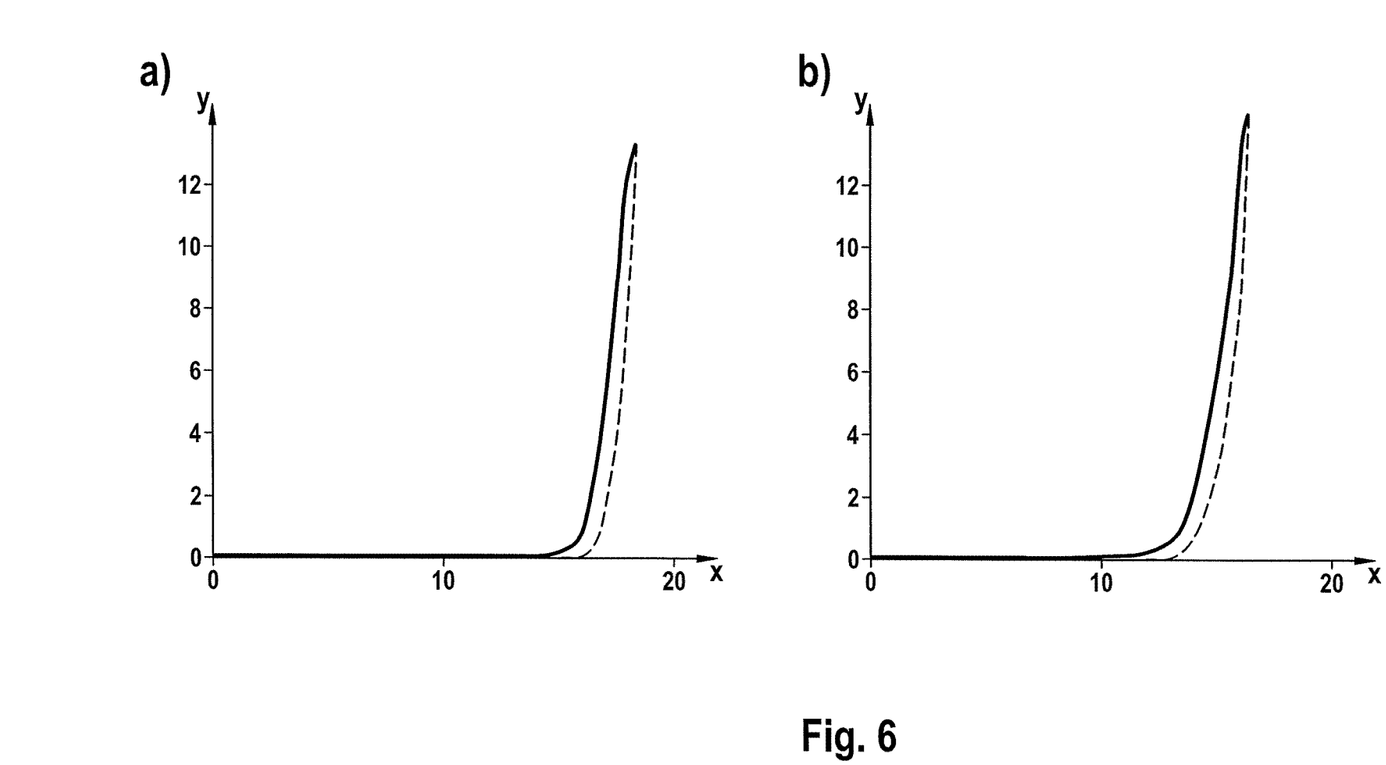
FIG. 6 shows a comparison between a pressure/travel diagram for a known master brake cylinder (a) and a master brake cylinder according to the invention (b) at a slow actuating speed.

FIG. 6

FIG. 6 shows, in a pressure/travel diagram, the hysteresis of the brake pressure in a pressure chamber of a known conventional master brake cylinder (a) and of a master brake cylinder according to the invention (b) in the case of a slow actuating speed. Here, the displacement travel of the piston is plotted on the X axis, and the brake pressure in the pressure chamber is plotted on the Y axis. The pressure buildup curve during the initiation of a braking operation is shown as a solid line, and the pressure reduction curve as the braking operation is ended is shown as a broken line. It is clearly apparent here that the pressure buildup curve has a slightly earlier, gentler rise in the case of the master brake cylinder according to the invention in view "b", and is then almost identically steep to the conventional master brake cylinder, with the result that the desired brake pressure is achieved just as quickly.

The pressure reduction curves of the rival systems are virtually the same, showing that the master brake cylinder according to the invention does not exhibit any disadvantages, such as excessively slow pressure reduction and "sticking" of the brake pedal.

Figure 7:
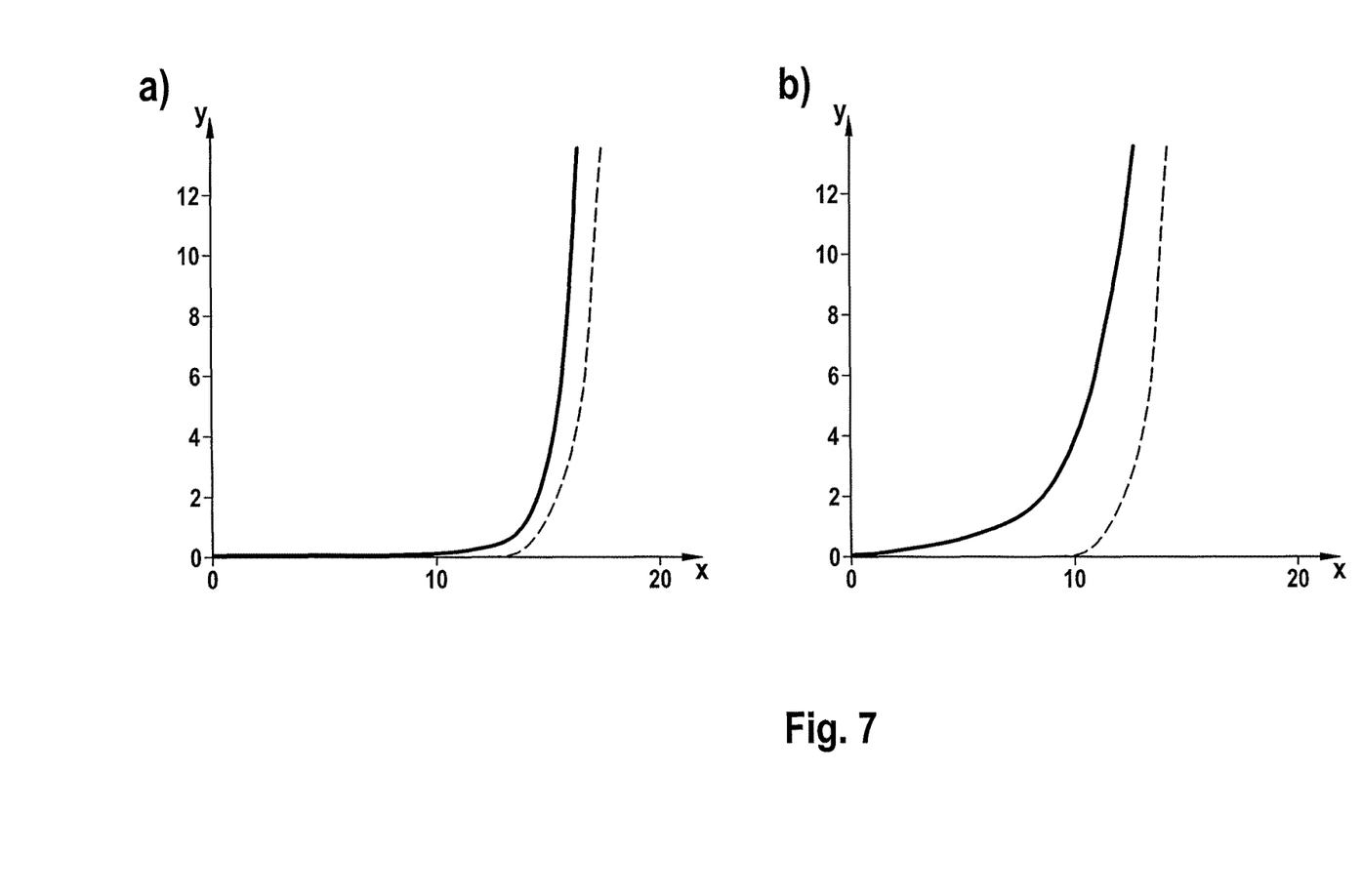
FIG. 7 shows a comparison between a pressure/travel diagram for a known master brake cylinder (a) and a master brake cylinder according to the invention (b) at a fast actuating speed.

FIG. 7

Similarly to FIG. 6, FIG. 7 shows the hysteresis of the conventional master brake cylinder (a) and the master brake cylinder according to the invention (b) but in the case of a quick brake actuating speed—e.g. full braking. This figure shows particularly clearly the advantages of the master brake cylinder according to the invention (b). Whereas, in the case of a conventional master brake cylinder, the steepness of the pressure buildup curve (a) is similar to that in FIG. 6, which would cause a somewhat late, hard and unpleasant feeling if the pedal were depressed quickly, the pressure buildup curve in the case of a master brake cylinder according to the invention (b) is significantly softer and gentler and, furthermore, the brake pressure buildup begins significantly earlier and also reaches the higher brake pressure values earlier and thus with a shorter pedal travel. As a result, the vehicle can be brought to a halt more quickly and with avoiding an unpleasant pedal feel. The steepness of the pressure reduction curve of the master brake cylinder according to the invention is similar and is thus without disadvantages as compared with the conventional master brake cylinder.

REFERENCE SIGNS

1 master brake cylinder
2 brake booster
3 housing
4 piston
5 piston
6 pressure chamber
7 pressure chamber 8 piston edge
9 piston edge
10 annular groove
11 annular groove
12 cup seal
13 cup seal
14 replenishing connection
15 replenishing connection
16 replenishing chamber
17 replenishing chamber
18 wall
19 return spring
20 return spring
21 replenishing passage
22 replenishing passage
23 pressure medium flow
B actuating direction
E1 main plane
E2 plane
E3 plane
E4 plane
S1 distance from the piston edge to plane E1
S2 distance from the piston edge to plane E2
S3 distance from the piston edge to plane E3
S4 distance from the piston edge to plane E4

The invention claimed is:

1. A master brake cylinder for a hydraulic motor vehicle brake system, which is acted upon by a pneumatic brake booster comprising:
at least one piston, which is movable in a housing and delimits a pressure chamber in the housing has a piston edge directed toward the pressure chamber and is sealed off from the pressure chamber by a cup seal arranged in an annular groove of the housing,
a plurality of replenishing connections is in each case provided in the piston said replenishing connections allowing a hydraulic connection between the pressure chamber and a pressureless replenishing chamber at the start of a braking operation,
wherein at least some of the replenishing connections are formed as transverse bores through a wall of the at least one piston and are arranged at an equal distance relative to the piston edge in a main plane (E1), the crossing of which by the cup seal defines a closure path of the piston and
wherein the replenishing connections are arranged in a manner distributed between at least three planes (E1, E2, E3) including the main plane (E1), wherein the at least three planes (E1, E2, E3) are arranged spaced apart parallel to the piston edge.

2. The master brake cylinder as claimed in claim 1, wherein the replenishing connections are arranged in a manner distributed between at least 4 planes (E1, E2, E3, E4) including the at least three planes (E1, E2, E3), wherein the at least four planes (E1, E2, E3, E4) are arranged spaced apart parallel to the piston edge.

3. The master brake cylinder as claimed in claim 2, wherein all the planes apart from the main plane (E1) are arranged offset in the direction of the piston edge relative to the main plane (E1), with the result that they are crossed by the cup seal (13) before the main plane (E1) when the piston is actuated.

4. The master brake cylinder as claimed in claim 2, wherein the main plane (E1) has at least 3 replenishing connections.

5. The master brake cylinder as claimed in claim 2, wherein a second plane (E2) of the at least four planes (E1, E2, E3, E4) has the same number or fewer replenishing connections as/than the main plane (E1).

6. The master brake cylinder as claimed in claim 2, wherein each plane of the at least 4 planes (E1, E2, E3, E4) has an equal number of replenishing connections.

7. The master brake cylinder as claimed in claim 2, wherein a cross section of each individual replenishing connection in the main plane (E1) is made the same size as or larger than individual cross sections of the replenishing connections in all the other planes.

8. The master brake cylinder as claimed in claim 2, wherein a sum of the cross sections of all the replenishing connections in the main plane (E1) is made the same size as or larger than a sum of the cross sections of all the replenishing connections in each individual further plane.

9. The master brake cylinder as claimed in claim 2, wherein a spacing between the first main plane (E1) and a last plane is in a range between 0.5 mm and 3 mm.

10. The master brake cylinder as claimed in claim 1, wherein all the planes apart from the main plane (E1) are arranged offset in the direction of the piston edge relative to the main plane (E1), with the result that they are crossed by the cup seal before the main plane (E1) when the piston is actuated.

11. The master brake cylinder as claimed in claim 1, wherein the main plane (E1) has at least 3 replenishing connections.

12. The master brake cylinder as claimed in claim 1, wherein a second plane (E2) of the at least three planes (E1, E2, E3) has the same number or fewer replenishing connections as/than the main plane (E1).

13. The master brake cylinder as claimed in claim 1, wherein each plane of the at least three planes (E1, E2, E3) has an equal number of replenishing connections.

14. The master brake cylinder as claimed in claim 1, wherein a cross section of each individual replenishing connection in the main plane (E1) is made the same size as or larger than individual cross sections of the replenishing connections in all the other planes.

15. The master brake cylinder as claimed in claim 1, wherein a sum of the cross sections of all the replenishing connections in the main plane (E1) is made the same size as or larger than a sum of the cross sections of all the replenishing connections in each individual further plane.

16. The master brake cylinder as claimed in claim 1, wherein a spacing between the first main plane (E1) and a last plane is in a range between 0.5 mm and 3 mm.

* * * * *